United States Patent
Hillier et al.

(10) Patent No.: US 9,137,342 B2
(45) Date of Patent: Sep. 15, 2015

(54) AUTOMATIC CONTACT POPULATION (75) Inventors: Peter M Hillier, Kanata (CA); Kenneth Armstrong, Woodlawn (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 13/591,962

(22) Filed: Aug. 22, 2012

(65) Prior Publication Data

US 2014/0057608 A1   Feb. 27, 2014

(51) Int. Cl.
| | |
|---|---|
| H04W 8/20 | (2009.01) |
| H04W 4/16 | (2009.01) |
| H04M 1/2745 | (2006.01) |
| H04M 1/56 | (2006.01) |
| H04M 3/46 | (2006.01) |
| H04W 88/06 | (2009.01) |
| H04M 3/42 | (2006.01) |
| H04M 7/12 | (2006.01) |
| H04M 1/253 | (2006.01) |
| H04M 1/57 | (2006.01) |
| H04M 3/493 | (2006.01) |

(52) U.S. Cl.
CPC .......... *H04M 1/274516* (2013.01); *H04M 1/56* (2013.01); *H04M 3/42093* (2013.01); *H04M 3/46* (2013.01); *H04M 7/128* (2013.01); *H04W 88/06* (2013.01); *H04M 1/2535* (2013.01); *H04M 1/274508* (2013.01); *H04M 1/274575* (2013.01); *H04M 1/274583* (2013.01); *H04M 1/575* (2013.01); *H04M 3/4931* (2013.01)

(58) Field of Classification Search
CPC .................................. H04W 4/16; H04W 8/20
USPC .......... 455/412.1, 412.2, 414.1, 414.2, 414.3, 455/415, 416, 417, 566, 567; 379/218.01
See application file for complete search history.

(56) References Cited

U.S. PATENT DOCUMENTS

| | | | |
|---|---|---|---|
| 7,349,907 B2 | 3/2008 | Celik | |
| 7,356,356 B2 | 4/2008 | Kim | |
| 8,180,045 B2 * | 5/2012 | Coppage | 379/355.04 |
| 2002/0076011 A1 | 6/2002 | Beyda | |
| 2005/0144249 A1 | 6/2005 | Alex et al. | |
| 2005/0157858 A1 | 7/2005 | Rajagopalan et al. | |
| 2006/0229063 A1 * | 10/2006 | Koch | 455/414.1 |
| 2006/0286971 A1 * | 12/2006 | Maly et al. | 455/415 |
| 2007/0111711 A1 * | 5/2007 | Ratnakar | 455/414.1 |
| 2007/0281676 A1 * | 12/2007 | Borras et al. | 455/418 |
| 2008/0176585 A1 * | 7/2008 | Eldering | 455/456.6 |
| 2009/0092233 A1 * | 4/2009 | Meli et al. | 379/88.11 |
| 2009/0097636 A1 | 4/2009 | Lederer et al. | |
| 2009/0143087 A1 * | 6/2009 | Minborg et al. | 455/466 |
| 2010/0015955 A1 * | 1/2010 | Backlund et al. | 455/414.1 |
| 2010/0098240 A1 * | 4/2010 | Ji et al. | 379/218.01 |
| 2010/0142691 A1 | 6/2010 | Robbins et al. | |
| 2011/0182414 A1 * | 7/2011 | Hemant et al. | 379/142.06 |
| 2011/0223890 A1 * | 9/2011 | Patterson et al. | 455/414.1 |
| 2012/0004015 A1 * | 1/2012 | Le Thierry D'Ennequin | 455/566 |
| 2012/0052851 A1 * | 3/2012 | Davis et al. | 455/417 |
| 2012/0202473 A1 * | 8/2012 | White et al. | 455/415 |
| 2013/0137408 A1 * | 5/2013 | Buschner et al. | 455/415 |

FOREIGN PATENT DOCUMENTS

| | | |
|---|---|---|
| EP | 1646213 A1 | 4/2006 |
| EP | 2475151 A1 | 7/2012 |
| WO | WO 01/59595 A2 | 8/2001 |

* cited by examiner

*Primary Examiner* — Christopher M Brandt (57) ABSTRACT

Systems and methods for populating a contacts directory are disclosed. A method of populating a contacts directory associated with a telephonic device includes placing a call from a first telephonic device to a second telephonic device. Called party contact information associated with the second telephonic device can be received and stored automatically in the contacts directory as a contact.

18 Claims, 6 Drawing Sheets

AUTOMATIC CONTACT POPULATION

BACKGROUND

"Dual mode" or "multi-mode" devices are devices with multiple network connectivity capabilities. Such devices may, for example, be capable of connecting to mobile phone carrier wireless networks and Wi-Fi networks. Supporting multiple networks, however, can introduce various complexities in using such devices. For example, preferred contact network, network specific user lookup services (e.g. 411), contact reachability, and so forth are some complexities that may be introduced by the use of multi-mode devices.

Many corporate environments, as well as other environments, may support a "bring your own device" model where individuals may bring a personal mobile device to the office, for example, and connect the personal mobile device to the corporate network using a WiFi connection. A SIP (session initiation protocol) client can then be used to allow calls to be made to and from the personal mobile device via the corporate PBX (private branch exchange) voice network.

However, while many office phones may include a corporate directory, the corporate directory may not be as easily accessible to the personal mobile device. Further, efficient management of contacts from the corporate directory may be difficult, particularly because corporate contacts using PBX extensions may have no meaning to a PSTN (public switched telephone network) or wireless carrier network.

From a fixed corporate desk phone, a user can program speed dials or other programmable keys for commonly called numbers, which can include PSTN numbers and PBX numbers. However, when using a personal mobile device assigning speed dials to business users may not be practical, particularly since the device may be more often used for personal usage. A user may choose to create contacts for certain co-workers with whom the user converses frequently, but these contacts are network specific and become useless if communication is attempted outside the corporate PBX network, such as from a wireless carrier network.

In many cases a user may use a corporate directory (such as via web, automated directory, or attendant-assisted directory for example) while at the user's desk to find a fellow employee's contact, and then manually dial the number from the mobile device. After the call the user can take the time to add the contact entry manually to the mobile device, which may be a time consuming, particularly if performed frequently. In many cases, the user may not intend to call the person again at least not in the near future) and may opt to forgo creation of the contact. However, a time may come again where the user wishes to contact the fellow employee again and the number lookup process is repeated.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the compete or near complete lack of an action, characteristic, property, state, structure, item, or result.

As used herein, an "application" refers to coded instructions executable by a processor which can be used to perform singular or multiple related specific tasks. For example, an application may include enterprise software, accounting software, office suites, graphics software, and media players. "Application" does not refer to system software or middleware which manages and integrates a computer's capabilities or to operating systems. Also, an "application" is typically an independently operable application. For example, the following description describes an enterprise system for managing other applications. The other applications can be accessed and operated within or from the enterprise system. However, the other applications are typically applications which can also be operated independently of the enterprise system or are applications which were developed separately from the enterprise system and subsequently integrated into the enterprise system.

EXAMPLE EMBODIMENTS

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth herein, it is noted in the present disclosure that when describing the system, or the related devices or methods, individual or separate descriptions are considered applicable to one other, whether or not explicitly discussed in the context of a particular example or embodiment. For example, in discussing a method for contact directory population per se, other device, system, and/or method embodiments are also included in such discussions, and vice versa.

Furthermore, various modifications and combinations can be derived from the present disclosure and illustrations, and as such, the following figures should not be considered limiting.

When a person makes or receives a phone call, an entry may be added to the call log. Many devices offer the ability to add the call log entry as a "contact" in a contacts directory. The process of adding the call log entry as a contact may involve navigating to the call log, selecting the correct entry, and choosing the option to add the entry as a contact. The user can then edit the contact to add the name of the called or calling party (which may be absent from the call log), as well as other contact information, such as email address, birthday, or the like.

Systems and methods for populating a contacts directory are disclosed herein for simplifying the process of contact creation and for managing created contacts. An example method of populating a contacts directory associated with a telephonic device includes placing a call from a first telephonic device to a second telephonic device. Called party contact information associated with the second telephonic device can be received and stored automatically in the contacts directory as a contact. Called party identification is not a traditional PSTN telephony offering. Calling Party identification, often referred to as caller-id, identifies incoming calls and associates a name with number. The caller does receive a name associated with the number they are dialing, or the party who actually answers the call.

The present technology utilizes a VoIP (voice over Internet protocol) messaging exchange model that can be used to provide contact information (such as name, PBX number, cell number, email address, and so forth) based on call signaling, which may then be used to automatically create a contact entry.

This present technology enables devices to automatically learn contacts based on calls made and received. Depending on the network to which the device is connected, additional information can be generated within the learned contacts, such as email address, DID (direct inward dial), business name, and so forth.

Figure 1:
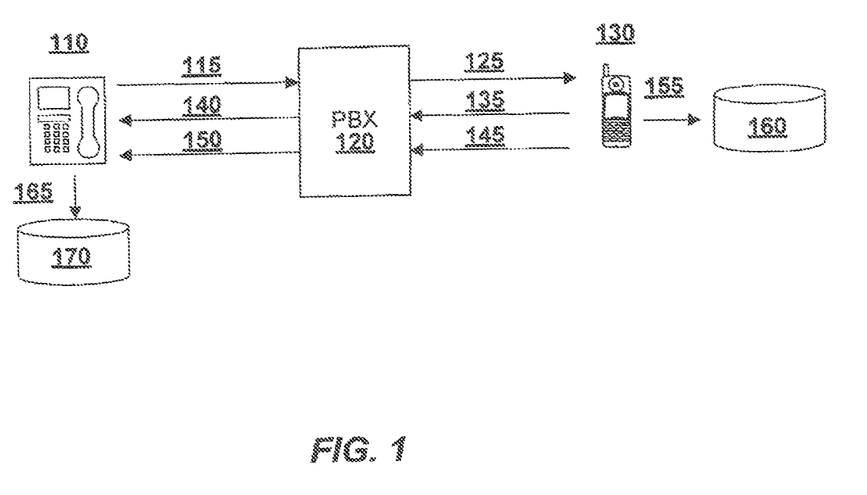
FIG. 1 illustrates a diagram of a system for automatic contact population in a called party device for contact information of a calling party in accordance with an embodiment of the present technology.

Reference will now be made to FIG. 1. The illustrated embodiment includes a client application on a mobile device 130 and a server application on a PBX server 120 for a communication network. For purposes of the present example, a PBX communication network is assumed to have a server component and a PSTN communication network is assumed to not have a server component to illustrate mechanisms applicable to client/server solutions or stand-alone client solutions. A dual or multi-mode device 110 may be connected to many different networks either simultaneously or at varying times throughout the day and a comprehensive solution for contacts management on any network or type of network may be desirable.

FIG. 1 illustrates a process for learning contacts. For example, a user may manually dial a PBX extension using the user's phone 110 (e.g., calling device). A SIP invitation 115 including the destination PBX number and the calling party information (such as name, PBX number, and/or any other suitable or desirable information) may be transmitted to the PBX server. The calling party information may be stored in a data store 170 on or accessible 165 by the calling device as shown in FIG. 1, or on, or accessible by the PBX server 120. The data store may be the same data store as used for the contacts directory and the calling party information may be stored in the contacts directory (whether visible to the calling party or not). In another example, the data store may comprise a different data store as is used for the contacts directory. For example, the one or more data stores may reside on one or more non-transitory computer readable storage media.

The SIP invitation may be forwarded 125 from the PBX server 120 to the called device 130. The called device can begin ringing and transmit 135 a ringing notification to the PBX server, which can in turn transmit 140 the ringing notification to the calling device 110.

The party at the called device 130 can answer 145 the phone call and the calling party information included in the SIP invitation can be automatically added 155 as a contact to a calling party contacts directory 160. In this manner, the called party need not manually enter the calling party information as a contact and the calling party information becomes available for use in contacting the calling party in the future.

While this example illustrates answering the call in order to create the contact, the contact can be created whether the call is answered by the user, answered by voice mail, is not answered, or even if the called device does not ring or otherwise respond to the SIP invitation.

On a PSTN network, incoming caller ID may be used to create the contact entry. Contact entries can be created for answered and missed calls. For outgoing calls, contacts may not be typically automatically created since the PSTN does not support a server component that can provide the connected party (far end) name or number. In some examples, however, a calling party may simply wish to automatically store the called or dialed PSTN phone number in the contacts directory even without the availability of the name or other information of the called party. In such instances, the calling device can be configured to automatically store the called number as a nameless contact.

On PBX networks, connected party information can enable reporting the name, number, and other information of the far end (i.e., called) device to which the calling device is connected. This information can be used to automatically generate contacts on outgoing calls with a name and the dialed number. For incoming calls or missed calls on the PBX network, contacts can be generated using caller ID in a similar fashion as the PSTN example or using information available through the PBX server as in the example of FIG. 1. It is to be noted that in some cases on the PBX network, a wide variety of information can be included and transmitted as contact information, including name and number, but also including e-mail address, alternate phone numbers, title or company position, other personal information, such as birthday, hire date, etc. or nearly any other information desired to be made available.

Figure 2:
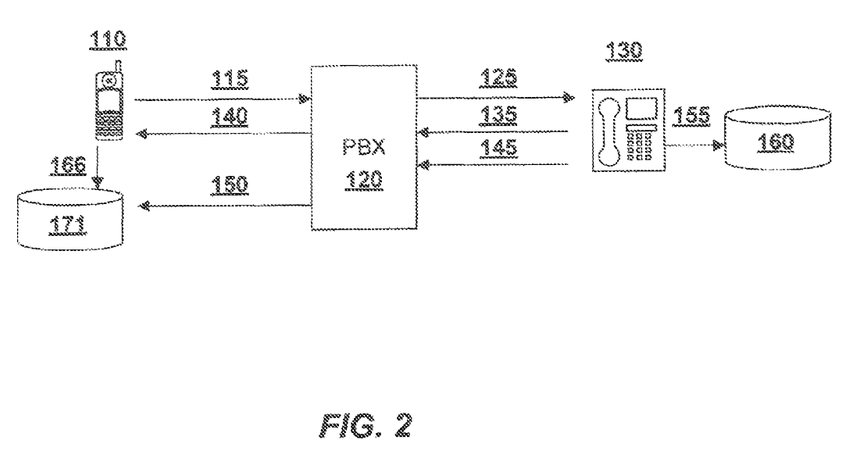
FIG. 2 illustrates a diagram of a system for automatic contact population in a calling party device for contact information of a called party in accordance with an embodiment of the present technology.

FIG. 2 illustrates an example embodiment where called party contact information is used to automatically create a contact entry for the calling party. This example includes and builds off of the example of FIG. 1 where the called party automatically creates a contact based on the calling party information. However, a calling party can automatically create a called party contact based on information received regardless of whether the called party creates a calling party contact or vice versa.

In FIG. 2, the calling device 110 receives an answer 150 from the called 130 device. The answer can include the connected party or called party contact information, such as a name and phone number. The calling device can be configured to automatically add 166 the called party contact information as a contact in a contact directory 171. While FIG. 2 illustrates answering of a phone call in order to receive the called party contact information and create the contact, the called party information may also be transmitted when the call is answered by voicemail, or when the ringing signal is transmitted from the called device, or may be transmitted from the PBX server to the calling device (when available on or to the PBX server) regardless of ringing or answering of the called device.

It is noted that either the called device or calling device may be any suitable type of device capable of learning contacts. For example, both devices may be mobile devices or both may be fixed, desk-type devices. Also, while the devices are illustrated as mobile telephones or desk telephones, it is to be understood that any device, mobile or fixed, capable of connecting to one or more networks and capable of being used for communication with another device using audio, video, text, or any other medium may suitably be used with the present technology.

In FIG. 2, the calling party originally manually dialed the called party phone number or extension, implying that the calling party remembered the called party extension or obtained it from somewhere, such as a web based corporate directory. As an alternate embodiment, the calling party may call the network operator and ask for the called party. The network operator information can be stored as a contact, but it may be valuable for the calling party to store the called party information even when the network operator, a receptionist, co-worker, or anyone else is originally called. In some examples, certain numbers, such as for a network operator, may be precluded from being stored as a contact according to rules included in the contact application on the calling party device. Whether the originally dialed number is used to create a contact entry or not, the calling party can receive called party contact information when the called party is connected to the calling party. This ensures that regardless of the method used to contact the called party (e.g 411 or click to call from CTI (computer telephony integration) application, etc.) will result in the correct contact name and number being added to the calling party's contact directory.

Figure 3:
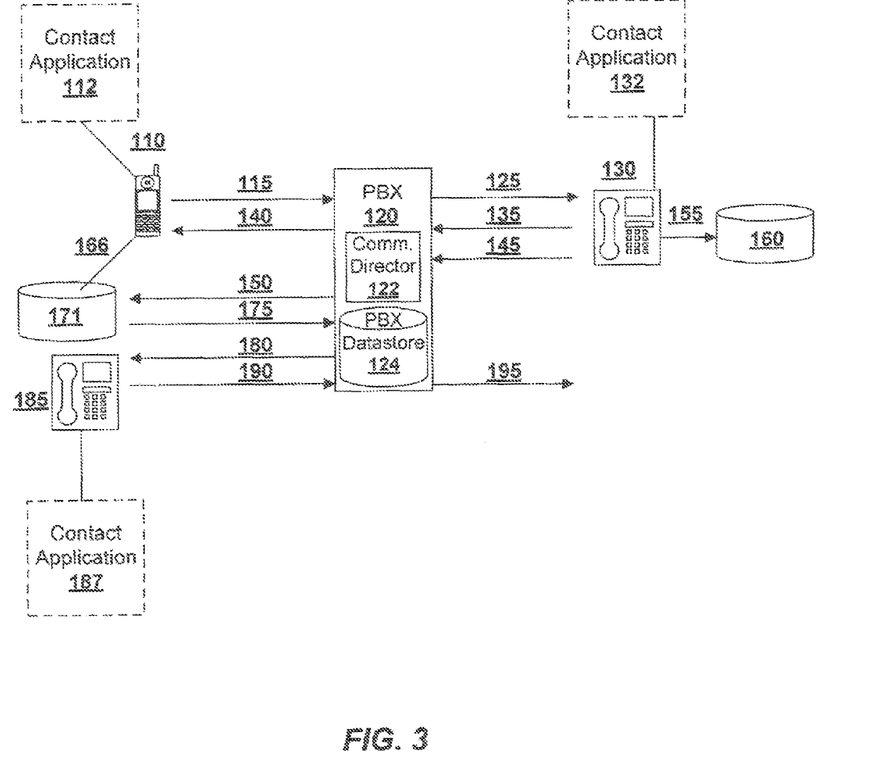
FIG. 3 illustrates a diagram of a system for automatic contact population in a transferred calling party device for contact information of a called party and in a called party device for transferred calling party device contact information in accordance with an embodiment of the present technology.

FIG. 3 illustrates an example embodiment including and building off of the examples illustrated in FIGS. 1 and 2. A user transfers a call between multiple of the user's devices— such as from a mobile phone to a desk phone, or vice versa. In this example, the calling party pushes 175 the call to another device 185, such as by transferring the call. The PBX server can ring 180 the other device and the other device can answer 190 the call. When the call is connected 195, the other device information can be transmitted through the PBX to the called party. The contact created for the calling party based on the first calling device can be updated to include contact information for the second or other device 185 as well. Also, as has been described above regarding FIG. 1, called party contact information can be received from the called party at the second device to create or update a contact on the second device for the called party. Moving the call from a desk phone to a mobile device can trigger a contact to be added to the mobile, phone, enabling the user to dial from the desk phone the first time and move the call to mobile so that subsequent calls can be originated directly from the mobile (via the new contact).

In an alternate implementation of the example illustrated in FIG. 3, rather than transferring the call to another PBX connected device, the user or calling party may attempt to transfer the call to a PSTN device. The PBX server 120 can invoke the call to the PSTN number, such as by using a ring group or EHDU (external hot desk user) device for example and can send updated connected party information back to the other end of the call (i.e., the called device or called party). This can easily be facilitated within the SIP by adding a header extension to the display update or resulting media renegotiation that would occur as a result of the "transfer" between a work extension and EHDU device.

In one example, the PBX server 120 can store ring group information in a PBX datastore 124. When a user dials a corporate extension, the PBX server can attempt to connect the user device 110 to the called device 130. However, the called device may not answer, or the called party may have established ring group rules (also stored on or accessible to the PBX server, such as in the PBX datastore 124) for where to route the call based on a schedule, time of day, identification of the calling party, and so forth. In such cases, the PBX can use the ring group information, which may include PBX and/or PSTN contact information, to connect the call to the called party and can also send the PBX and/or PSTN contact information to the calling party to update the calling party's contact for the called party.

If a call originating from the calling device 110 hits a personal ring group and contact is made to a PSTN number (e.g. cell number), a communications director 122 on the PBX server 120 may provide the alternate contact information from the PBX datastore 124. For example, calling 1111 could connect to John Smith's cell number 613-555-1234 by virtue of John's PRG (personal ring group). This would create a contact for John Smith with Work Extension 1111, and would then update the contact to include the mobile number 613-555-1234. This allows a contact application to grow its list of reachable numbers across multiple networks. The PBX may report PSTN or other network numbers that result from call forwarding depending on configuration. For example, the CFNA (call forward no answer) to a PSTN cell number could trigger information to be added to the contact, whereas CFNA to corporate voicemail would not trigger an update. Optionally, if a DID is available, the PBX can choose to suppress notification of PSTN numbers contained in the ring group or forwarding configurations. In this scenario the contact will contain the PBX extension and DID of John Smith. The cellular number for John Smith will be learned if the user called (or was called by) John Smith on his cell phone.

The present technology can utilize a contact application supporting an API (application programming interface) suite to facilitate searching, creating, modifying, or deleting contacts. An example of such a system is the Android™ operating system which supports the Android Contacts™ application. Any other suitable systems and applications may also be used, such as those made by Apple, Microsoft, Nokia, Blackberry, Samsung, and others.

In one embodiment the client contact application 112, 132, 187 can be configured to contain a network profile for the networks for which the phone may be used. For a PBX network, the profile may identify, for example, the corporate DID and email format (such as First.Last@Domain.Com) used by the corporation. Many forms of information can be provided using the present technology. When contacts are created by incoming or outgoing calls across this network, a PSTN corporate DID can also be created for the contact, along with an email address. For example, calling or being called by PBX extension 71234 may result in being connected to John Doe. A contact entry for John Doe can be created with Work Extension 71234, Work Number 613-599-5660p71234 (using DID 613-599-5860), and email John.Doe@Mitel.Com. In other words, roles used by the contact application can be used to create more contact information than may have been received from the called/calling party. Dialing or receiving information for a work extension can result in automatic creation of a work number including the DID, or dialing or receiving a work number including the DID can result in automatic creation of a work extension in the contact for the called/calling party. Likewise, the name received from the called/calling party can be used to populate an email address, instant message (IM) handle, or the like. In some aspects, additional information can be obtained from corporate, social, or other networks to which the device is connected to further populate information in the contact entry based on the called/calling party contact information received when the call was placed/received.

In one embodiment, the PBX server 120 communication director 122 provides the additional contact information (email, DID, cellular number, etc.) which is then added to the connected party information. This may be provided in addition to the calling party or called party information. SIP extensions can be used to add these parameters in the appropriate SIP headers. This user information can be obtained from a PBX database or some other data repository. The additional numbers or other data can be tagged, for example, with "Work" for the DID number, "Work Ext" for the PBX number, and "Mobil" for the cellular number to aid in proper classification of the numbers within the contact entry.

In any of the examples described herein, the technology can be configured to determine whether a contact entry for the called or calling party already exists. If an entry does exist, a check can be performed for whether called/calling party contact information received from the called/calling party is cumulative of information already stored in the contacts database or whether there is any additional and/or changed information that can be added or changed to update the contact.

The contacts application 112, 132, 187 can use substring matching to attempt to identify existing contacts. Since names may differ from network to network, a substring match may often occur. For example, a carrier number has "J. Smith" as the name, while a work PBX number may have "John Smith". Any suitable known pattern matching can be used to associate the two entries, and both the PSTN and PBX number can be added to a same contact entry. Optionally a notification alert can be generated, asking the user if it is okay to combine the contact entries, or to create a new entry. Notifications are common in mobile device operating systems, and notifications have their own "notification bar" on the main splash screen used to relay events to the user.

Figure 4:
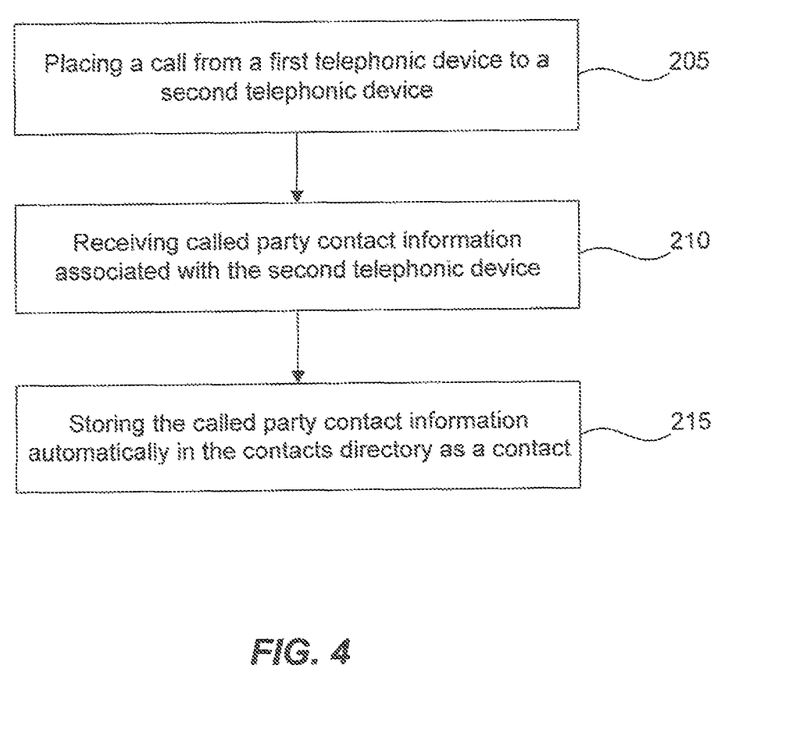
FIGS. 4-5 illustrate flow diagrams of method for populating a contacts directory in accordance with an embodiment of the present technology.

Referring to FIG. 4, a flow diagram of a method is illustrated for populating a contacts directory associated with a telephonic device. The method includes placing 205 a call from a first telephonic device to a second telephonic device. Galled party contact information associated with the second telephonic device can be received 210 from the second telephone device, or from an intermediate device, such as a PBX server, for example. The called party contact information can be stored 215 automatically in the contacts directory as a contact. The contacts directory can be stored on or be accessible, by the first telephonic device. In another implementation, the contacts directory can be stored on the intermediate device and can subsequently be accessed by the first telephone device on-demand when the user wishes to place a call.

Storing the called party contact information as a contact may include storing the called party contact information as a new contact when a contact for a called party at the second telephonic device does not already exist and/or storing the called party contact information to an existing contact when a contact for the called party at the second telephonic device already exists and the called party contact information is more than cumulative of information stored for the contact.

The method can include tagging the contact with a label associated with a network over which the call is placed. In one aspect, availability of the contact for placing a second call to the contact may then be dependent on availability of the network over which the call was originally placed. For example, if a contact is available to contact over a PBX network, but has no other contact methods associated therewith (such as PSTN number, email address, etc.), and the first telephonic device is not connected to the PBX network, the contact may be not displayed to the user; displayed, but grayed out or otherwise marked as unavailable; or displayed, but include a notification when the user attempts to connect that the requisite network for connecting to the contact is unavailable.

In one aspect, the method can also include prioritizing the contact among other contacts based on frequency of calls to the contact. For example, the more frequently the user calls certain contacts, the more prominently those contacts may be placed in an ordered list of contacts. More recent calls may also be prioritized over less recent calls. In one aspect, contacts can be organized into groups based on filters. For example, contacts accessed, used and/or to/from whom a predetermined minimum number of calls are made or received within a predetermined time period can be classified as frequently used contacts, which may then be sorted alphabetically or according to any other desired convention. Less frequently and/or unused contacts can be similarly classified/grouped, sorted, etc.

The method can include also generating the contact when the call is placed using a click-to-call format where the user clicks an object (e.g., button, image or text) to request an immediate connection with another person in real-time either by phone call, VoIP, or text. Thus, any suitable method may be used for placing the call, and the technology can be used accordingly to store the called party contact information.

Figure 5:
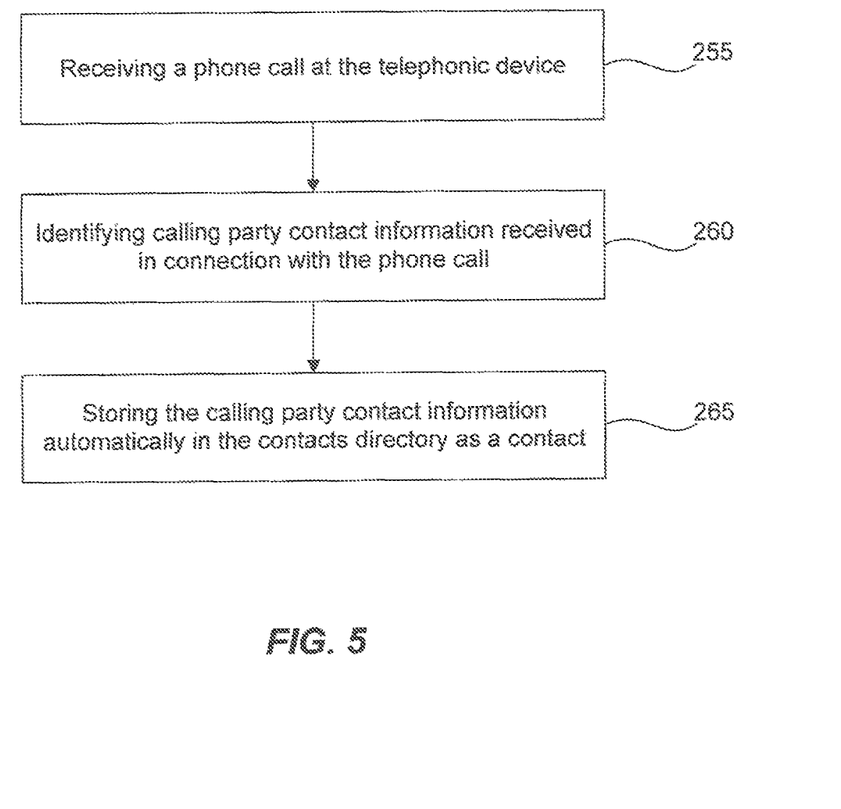

Referring to FIG. 5, a flow diagram of another method of populating a contacts directory associated with a telephonic device is illustrated in accordance with an example of the present technology. The method can include receiving 255 a phone call at the telephonic device, identifying 260 calling party contact information received in connection with the phone call, and storing 265 the calling party contact information automatically in the contacts directory as a contact. The method can be performed whether the phone call is received over a PBX network, a PSTN network, or any other suitable network over which calling party information can be received.

Figure 6:
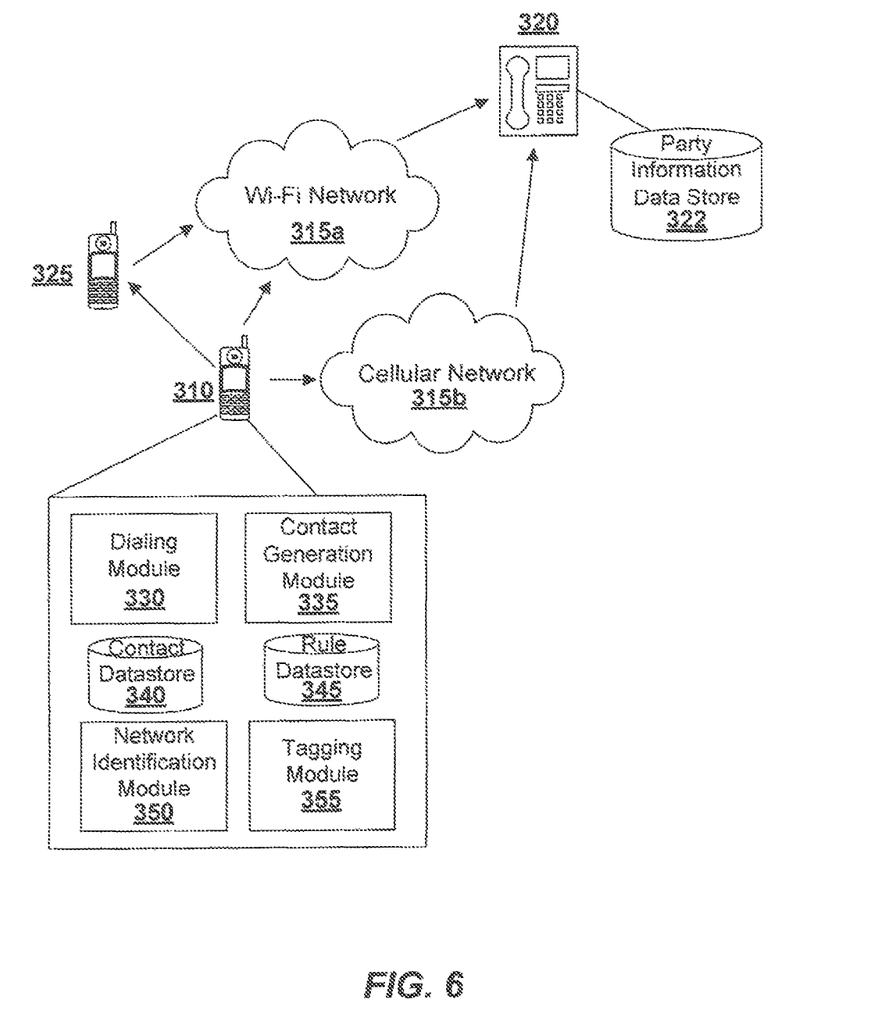
FIG. 6 illustrates a block diagram of a system for populating a contacts directory in accordance with an embodiment of the present technology.

FIG. 6 illustrates a system for populating a contacts directory associated with a telephonic device in accordance with an example of the present technology. The system includes a telephonic device 310 configured to connect to a telephone network 315a, 316b. For example, a dialing module 330 can be used to initiate a call over the telephone network. A contacts directory in a contact datastore 340 can be associated with the telephonic device. For example, the contacts directory may be stored in a memory of the telephonic device. A contact generation module 335 may also be associated with the telephonic device. The contact generation module may be stored in a memory of the telephonic device and may be executed by a processor of the telephonic device. The contact generation module can be configured to receive party contact information associated with a party or party device 320 through the telephone network 315a, 315b, and can store the party contact information automatically in the contacts directory as a contact. The party contact information can be retrieved from a party information data store 322 and transmitted to the telephonic device, for example, to be stored in the contact data store for the telephonic device. As illustrated, the device(s) may be multi-mode devices capable of communicating over multiple networks, such as cellular networks 315b and Wi-Fi networks 315a.

The system may further comprise a second telephonic device 325 configured to connect to the telephone network 315a, 315b and to receive a call placed over the telephone network when transferred from the telephonic device 310, the contact generation module 335 being on the second telephonic device and operable to store the party contact information as the contact in the contacts directory on the second telephonic device. This may be performed similarly as described above with regard to FIG. 3.

The system may also include a network identification module 350 operable to add additional profile information to the party contact information when creating the contact based on a rule stored in a rule data store 345 on the telephonic device 310 to enable use of the contact across multiple different types of telephone networks 315a, 315b when identification of the telephone network triggers the rule. Thus, for example, the contact may be created with the work extension and the work DID, as has been described.

The system can also is a tagging module 355 configured to tag the contact based on the telephone network 315a, 315b used for contacting a party to enable selective availability of the contact information depending on the availability of the telephone network.

The contact generation module 335 can include a user configurable option displayable to the user for automatic creation of contacts for incoming, missed, and/or outgoing calls, or any combination thereof.

The system does not require a corporate directory download or other sync operation, which may potentially provide many numbers with which the user has no desire to communicate or which are not relevant to the network being used.

The system also enables users to update contact information in another users' device 320 simply by calling the other user.

The telephone network can optionally provide alternate network contacts on behalf of the called party, such as via a PBX server 120 (FIGS. 1-3). If a calling party calls the PBX and the PBX knows the called party has other network contacts (e.g. programmed in the corporate directory or in some central data store) the PBX can feed these alternate contacts back to the calling party to populate the contact list. This can be done on alerting, busy, or talk states using a signaling extension (e.g. of the SIP protocol) and can extend the list of contact options in the mobile device so that the device has alternate networks to try when (in this example) the PBX network is not available.

The dialing module 330 can enable a user to dial a default or selected number of a listed contact using any known method. If the associated network is not available, then the telephonic device may transparently attempt to ring the contact using a listed alternative number an for using an alternative network.

The contact data store 340 can provide a contacts GUI (graphical user interface) including contacts for the user. The GUI may be configured to visually differentiate (e.g. greyed out, or simply not displayed) numbers on networks not currently accessible (e.g. user is away from the office).

The system can perform contact manipulation based on active or available networks. The system may also perform network bridging (relates a contact on network A to a contact on network B, assuming it is the same contact (but different unique id per network)—for example, J. Smith on a PBX with extension 1234, John Smith on the PSTN (mobile) at 613-219-2502, and John on the global SIP provider with id johnsmith@sipservice.com. The contacts can be identified as related based on the name (e.g. string comparison), a picture of the contact (e.g., facial recognition), etc. For example, facial recognition can be used to group network/application contacts (email, mobile, work, home, Facebook, LinkedIn, etc.) into a single contact. Thus, the system enables creating a single contact to manage separate network contact points.

If the call log or call history is used to dial, or if the user simply dials the number, such as the PBX number for example, the system can identify whether the appropriate network is available. If the network is not available, the system can perform a reverse lookup into the contact list (including masked contacts) to determine the next best network to use. Thus, if a user dialed a PBX extension but was not actually connected to the PBX, the application may find a contact in the phone matching the dialed number, find an alternate number (e.g a PSTN number) and dial that number to the carrier (because the PBX is not reachable).

The present technology can also be used as a security feature for corporate networks. When the device is cut off from a given network, all contacts on the network may be hidden from view, or even removed. The location of the device can dictate what contacts can be accessed, as well as the network that can be accessed.

If a calling party is unable to connect to a called party (e.g., ringing but no answer, voicemail, busy, etc.) the client contact application can suggest alternate numbers stored against the contact. Similarly, the PBX can push these alternate or temporary numbers to the device similar to call forwarding, except the PBX does not forward the call and instead provides the number to the calling device to manage the call. This feature can be useful, for example, when the alternate number is a Skype® number. The PBX may not be able to forward the call to the Skype account, but the client application on the mobile device can handle the operation. In other words, the PBX may not have access to the Skype network, but the client app on the mobile device may. This can enable cross network call forwarding.

In summary, the present technology provides for learning network contacts and can provide a network bridge directory that is capable of associating many contact addresses for the same person into a logical ordering, and is capable of completing/routing calls even when an inaccessible network ID is attempted. The present technology can provide a convenient and efficient method of growing a list of frequent business contacts within a personal device without manually adding the contacts.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of populating a contacts directory associated with a telephonic device, comprising:
   placing a call from a first telephonic device to a second telephonic device;
   receiving called party contact information associated with the second telephonic device; and
   storing the called party contact information automatically in the contacts directory as a contact, wherein receiving the called party contact information associated with the second telephonic device comprises receiving the called party contact information at a third telephonic device inactively engaged in the call and different from the first and second telephonic devices, and storing the called party contact information comprises automatically storing the called party contact information as a contact on the third telephonic device.

2. The method of claim 1, wherein placing the call comprises placing the call over a private branch exchange (PBX) network.

3. The method of claim 1, wherein storing the called party contact information as a contact comprises:
   storing the called party contact information as a new contact when a contact for a called party at the second telephonic device does not already exist; or
   storing the called party contact information to an existing contact when a contact for the called party at the second telephonic device already exists and the called party contact information is more than cumulative of information stored for the contact.

4. The method of claim 1, further comprising tagging the contact with a label associated with a network over which the call is placed.

5. The method of claim 1, wherein the call from the first telephonic device to the second telephonic device is placed through the third telephonic device, the method further comprising transferring the call from the third device to the second device to receive the called party contact information associated with the second telephonic device.

6. The method of claim 1, wherein the call from the first telephonic device to the second telephonic device is placed over a private branch exchange (PBX) network and the called party contact information includes a public switched telephone network (PSTN) phone number associated with a PBX phone number in a ring group used to place the call.

7. The method of claim 1, wherein the called party contact information includes contact information for multiple different contact methods.

8. The method of claim 1, wherein availability of the contact for placing a second call is dependent on a network to which the first telephonic device is connected.

9. The method of claim 1, further comprising prioritizing the contact among other contacts based on frequency of calls to the contact.

10. The method of claim 1, further comprising adding additional profile information to the called party contact information when creating the contact based on a rule stored in the first telephonic device to enable use of the contact across multiple different types of telephone networks.

11. The method of claim 1, wherein the called party contact information includes other information in addition to a name and phone number of a called party.

12. A system for populating a contacts directory associated with a telephonic device, comprising:
   a telephonic device configured to connect to a telephone network;
   a contacts directory associated with the telephonic device;
   a contact generation module associated with the telephonic device, and being configured to receive party contact information associated with a party through the telephone network, and store the party contact information automatically in the contacts directory as a contact;
   a network identification module operable to identify the type of said telephone network;
   a tagging module configured to tag the contact based on the identified telephone network to enable selective availability of the contact information depending on the availability of the telephone network; and
   a graphical user interface to enable selective availability of the contact information depending on the availability of the telephone network by visually differentiating numbers on networks not currently accessible to the telephonic device.

13. The system of claim 12, further comprising a second telephonic device configured to connect to the telephone network and to receive a call placed over the telephone network when transferred from the telephonic device, the contact generation module being on the second telephonic device and operable to store the party contact information as the contact in the contacts directory on the second telephonic device.

14. The system of claim 12, wherein the network identification module operable to add additional profile information to the party contact information when creating the contact based on a rule stored in the telephonic device to enable use of the contact across multiple different types of telephone networks when identification of the telephone network triggers the rule.

15. A method of populating a contacts directory associated with a telephonic device, comprising:
   receiving a phone call at the telephonic device;
   identifying calling party contact information received in connection with the phone call;
   storing the calling party contact information automatically in the contacts directory as a contact;
   tagging the contact with a label associated with a network over which the call was received, wherein the availability of the calling party for placing a call is dependent on a network to which the telephonic device is connected; and
   using a graphical user interface of the telephonic device to enable selective availability of the calling party contact information depending on the availability of the network over which the call was received by visually differentiating numbers on networks not currently accessible to the telephonic device.

16. The method as in claim 15, wherein the phone call is received over a private branch exchange (PBX) network.

17. The method as in claim 15, wherein the phone call is received over a public switched telephone network (PSTN).

18. The method of claim 15, wherein the calling party contact information includes other information in addition to a name and phone number of the calling party.

* * * * *